(12) United States Patent
Kim et al.

(10) Patent No.: US 11,928,715 B2
(45) Date of Patent: Mar. 12, 2024

(54) SYSTEM AND METHOD FOR RESELLING RESERVED INSTANCE

(71) Applicant: Bespin Global Inc., Seoul (KR)

(72) Inventors: Sung Soo Kim, Yongin-si (KR); Dae Sik Park, Seoul (KR); Gyeong Tae Hong, Seongnam-si (KR)

(73) Assignee: Bespin Global Inc., Seoul (KR)

( * ) Notice: Subject to any disclaimer, the term of this patent is extended or adjusted under 35 U.S.C. 154(b) by 468 days.

(21) Appl. No.: 17/100,803

(22) Filed: Nov. 20, 2020

(65) Prior Publication Data

US 2022/0164843 A1   May 26, 2022

(51) Int. Cl.
*G06Q 30/00* (2023.01)
*G06Q 30/0601* (2023.01)

(52) U.S. Cl.
CPC .............. *G06Q 30/0617* (2013.01)

(58) Field of Classification Search
None
See application file for complete search history.

(56) References Cited

U.S. PATENT DOCUMENTS

| 9,749,331 | B1 | 8/2017 | Koeten et al. | |
| 10,152,314 | B2* | 12/2018 | Borthakur | G06F 9/5061 |
| 10,620,930 | B2* | 4/2020 | Borthakur | G06F 8/61 |
| 10,713,030 | B2* | 7/2020 | Borthakur | G06F 21/105 |
| 11,151,012 | B2* | 10/2021 | Sprague | G06F 11/3075 |
| 11,157,255 | B2* | 10/2021 | Borthakur | H04L 67/34 |

(Continued)

FOREIGN PATENT DOCUMENTS

| JP | 2018-163697 A | 10/2018 |
| JP | 6444494 B2 | 12/2018 |
| KR | 10-2014-0003045 A | 1/2014 |

(Continued)

OTHER PUBLICATIONS

VMware Suite Staff, "What Are Reserved Instances?" pp. 1-5, Nov. 2, 2018. Retrieved from https://blogs.vmware.com/cloudhealth/what-are-reserved-instances/ (Year: 2018).*

(Continued)

*Primary Examiner* — Naeem U Haq
(74) *Attorney, Agent, or Firm* — Insight Law Group, PLLC; Seung Lee (57) ABSTRACT

Disclosed are a system and method for reselling a reserved instance, which creates earnings by purchasing a reserved instance from a reserved instance providing system, such as a cloud service system, and reselling the reserved instance to a client, and a recording medium in which a program for executing the method is written. The system purchases a reserved instance from a reserved instance providing system and resells the reserved instance to a client, and includes an instance usage prediction unit for predicting instance usage of a client using a machine learning model pre-trained in relation to the instance usage, a reserved instance purchase quantity determination unit for determining a reserved instance purchase quantity based on the instance usage, a reserved instance purchase unit for purchasing the reserved instance based on the reserved instance purchase quantity, and an instance reselling unit for reselling the purchased reserved instance to the client.

11 Claims, 8 Drawing Sheets

(56) References Cited

U.S. PATENT DOCUMENTS

2021/0255902 A1* 8/2021 Soon-Shiong ...... G06F 9/45558

FOREIGN PATENT DOCUMENTS

| KR | 10-2016-0072391 A1 | 6/2016 |
| KR | 10-2018-0068514 A1 | 6/2018 |

OTHER PUBLICATIONS

English translation of foreign reference CN 114549101 A (Year: 2022).*

English translation of foreign reference KR 102184927 B1 (Year: 2020).*

* cited by examiner

SYSTEM AND METHOD FOR RESELLING RESERVED INSTANCE

BACKGROUND OF THE DISCLOSURE

Field of the Disclosure

The present disclosure relates to a system and method for reselling a reserved instance, and particularly, to a system and method for reselling a reserved instance, wherein a reserved instance is purchased from a reserved instance providing system, such as a cloud service system, and is resold to a client.

Description of Related Art

A cloud system provides an environment in which a user accesses a virtual server through a terminal and freely implements a desired service. The cloud system may provide various services, such as a service in which some storage space is leased to a user and the user accesses the cloud system through a terminal and stores data in a space assigned thereto, a service for providing infrastructure, such as a basic computing environment or a network service, a platform service for providing a platform or solution for using a computer, and a software service for enabling application software to be used over a network. The cloud system is used in various fields, such as a mobile application, game, a shopping mall, and social networking service. Such a cloud system provides an advantage in that a user who uses a service can use resources without temporal and spatial restrictions and check a present condition in which resources are used in real time. Furthermore, the cloud system may provide a service so that the same role as a role of the existing physical server can be played, may manage provided service resources in real time, and may provide a function for searching for and classifying service resources.

A client needs to pay a fee fixed in a cloud system in return for using resources of a cloud system. For example, when a client pays an on-demand fee by making an on-demand request to use resources from a cloud system, the client may pay a fee proportional to a user time and use resources (e.g., instance) of the cloud system. A recent cloud system enables a client to purchase a reserved instance and to use resources of the cloud system at a lower price than an on-demand fee billed per use time. The reserved instance may be reserved and used by a client for a schedule period (e.g., 1 year or 3 years). For example, an EC2 reserved instance provided by Amazon provides a discount benefit having a maximum level of 62%, compared to an on-demand fee.

SUMMARY OF THE DISCLOSURE

An object of the present disclosure is to provide a system and method for reselling a reserved instance, which can create a profit by purchasing a reserved instance from a reserved instance providing system, such as a cloud service system, and reselling the reserved instance to a client, and a recording medium in which a program for executing the method is written.

Furthermore, an object of the present disclosure is to provide a system and method for reselling a reserved instance, which can maximize an earnings rate according to the reselling of a reserved instance by calculating a proper reserved instance purchase quantity based on the prediction of the instance usage of a client in reselling the reserved instance to the client, and a recording medium in which a program for executing the method is written.

In an aspect, a system for reselling a reserved instance purchases a reserved instance from a reserved instance providing system and resells the reserved instance to a client. The system includes an instance usage prediction unit configured to predict instance usage of a client using a machine learning model pre-trained in relation to the instance usage, a reserved instance purchase quantity determination unit configured to determine a reserved instance purchase quantity based on the instance usage, a reserved instance purchase unit configured to purchase the reserved instance based on the reserved instance purchase quantity, and an instance reselling unit configured to resell the purchased reserved instance to the client.

A system for reselling a reserved instance according to an embodiment of the present disclosure may further include a learning unit configured to generate a machine learning model by extracting variables, including a use pattern and the number of clients for each operating system (OS) of an instance, for each instance type, for each available area, and each region, from learning data including on-demand request data requested by a client.

The learning unit may be configured to generate at least one of machine learning models, including a generalized linear regression (GLR) model for predicting instance usage using the usage pattern and the number of clients for each OS, for each instance type, for each available area, and for each region as independent variables, a multivariate spline regression (MSR) model for predicting instance usage by applying a smoothing function to the independent variables, a long short term memory (LSTM) model for predicting a future instance use time pattern from a past instance use time pattern, and a multivariate regression (MR) model for predicting instance usage through deep learning based on the independent variables.

The instance usage prediction unit may be configured to predict instance usage based on at least one of machine learning models, including the GLR model, the MSR model, the LSTM model, and the MR model.

The learning unit may include a GLR learning unit configured to generate the GLR model, an MSR learning unit configured to generate the MSR model, an LSTM learning unit configured to generate the LSTM model, and an MR learning unit configured to generate the MR model.

The instance usage prediction unit may include an error comparator configured to compare predicted errors of machine learning models, including the GLR model, the MSR model, the LSTM model, and the MR model, a machine learning model selection unit configured to select any one of the machine learning models based on a result of the comparison between the predicted errors of the machine learning models, and an instance usage estimation unit configured to estimate instance usage based on the machine learning model selected by the machine learning model selection unit. The machine learning model selection unit may be configured to select a machine learning model having the smallest root mean square error (RMSE) value among the machine learning models.

The instance usage prediction unit may include a first instance usage prediction unit configured to output first instance usage by predicting the instance usage based on the GLR model, a second instance usage prediction unit configured to output second instance usage by predicting the instance usage based on the MSR model, a third instance usage prediction unit configured to output third instance usage by predicting the instance usage based on the LSTM model, and a fourth instance usage prediction unit configured to output fourth instance usage by predicting the instance usage based on the MR model, an error analysis unit configured to calculate weight for the machine learning models by analyzing the predicted errors of the machine learning models, including the GLR model, the MSR model, the LSTM model, and the MR model and an instance usage estimation unit configured to estimate the instance usage by adjusting a reflection ratio of each of the first instance usage, the second instance usage, the third instance usage, and the fourth instance usage based on the weight for the machine learning models.

In an aspect, the system for reselling a reserved instance may further include an extreme value removal unit configured to predict the instance usage by removing data out of a reference range from data related to an instance request.

The reserved instance purchase quantity determination unit may be configured to recommend a purchase quantity of the reserved instance for each OS, for each instance type, for each available area, and for each region, calculate an earnings rate when the reserved instance is purchased, and provide the earnings rate.

In an aspect, a method of reselling a reserved instance is a method of reselling a reserved instance, which purchases a reserved instance from a reserved instance providing system and resells the reserved instance to a client. The method includes predicting, by an instance usage prediction unit, instance usage of a client using a machine learning model pre-trained in relation to the instance usage, determining, by a reserved instance purchase quantity determination unit, a reserved instance purchase quantity based on the instance usage, purchasing, by a reserved instance purchase unit, the reserved instance from the reserved instance providing system based on the reserved instance purchase quantity, and reselling, by an instance reselling unit, the purchased reserved instance to the client.

In an aspect, the method of reselling a reserved instance may further include generating, by a learning unit, the machine learning model by extracting variables, comprising a use pattern and the number of clients for each operating system (OS) of the instance, for each instance type, for each available area, and for each region, from learning data comprising on-demand request data requested by the client.

Generating the machine learning model may include generating at least one of machine learning models, including a GLR model for predicting the instance usage using a usage pattern and the number of clients for each OS, for each instance type, for each available area, and for each region as independent variables, an MSR model for predicting the instance usage by applying a smoothing function to the independent variables, an LSTM model for predicting a future instance use time pattern from a past instance use time pattern, and an MR model for predicting the instance usage through deep learning based on the independent variables.

Predicting the instance usage may include predicting the instance usage based on at least one of the machine learning models, including the GLR model, the MSR model, the LSTM model, and the MR model.

Predicting the instance usage may include comparing, by the error comparator, predicted errors of the machine learning models including the GLR model, the MSR model, the LSTM model, and the MR model, selecting, by the machine learning model selection unit, any one of the machine learning models based on a result of the comparison between the predicted errors of the machine learning models, and estimating, by an instance usage estimation unit, the instance usage based on the machine learning model selected by the machine learning model selection unit.

Predicting the instance usage includes outputting, by a first instance usage prediction unit, first instance usage by predicting the instance usage based on the GLR model, outputting, by a second instance usage prediction unit, second instance usage by predicting the instance usage based on the MSR model, outputting, by a third instance usage prediction unit, third instance usage by predicting the instance usage based on the LSTM model, outputting, by a fourth instance usage prediction unit, fourth instance usage by predicting the instance usage based on the MR model, calculating, by an error analysis unit, weight for the machine learning models by analyzing predicted errors of the machine learning models including the GLR model, the MSR model, the LSTM model, and the MR model, and estimating, by the instance usage estimation unit, the instance usage by adjusting a reflection ratio of each of the first instance usage, the second instance usage, the third instance usage, and the fourth instance usage based on the weight for the machine learning models.

According to the present disclosure, there is provided a computer-readable recording medium in which a program for executing the method of reselling a reserved instance is written.

According to an embodiment of the present disclosure, there are provided the system and method for reselling a reserved instance, which can create a profit by purchasing a reserved instance from a reserved instance providing system, such as a cloud service system, and reselling the reserved instance to a client, and the recording medium in which a program for executing the method is written.

According to an embodiment of the present disclosure, instance usage of a client can be estimated by using all of the GLR model, the MSR model, the LSTM model, and the MR model and adjusting a reflection ratio of each of the models.

According to an embodiment of the present disclosure, instance usage can be predicted in preparation for a future client instance request in the state in which an instance request has not been received from a client. Accuracy in the prediction of instance usage of a future client can be improved using a plurality of search engines to which weight is assigned based on a predicted error.

According to an embodiment of the present disclosure, there are provided the system and method for reselling a reserved instance, which can maximize an earnings rate according to the reselling of a reserved instance by calculating a proper reserved instance purchase quantity based on the prediction of the instance usage of a client in reselling the reserved instance to the client, and the recording medium in which a program for executing the method is written.

The present disclosure can minimize a loss section when a reserved instance is resold to a client.

DESCRIPTION OF SPECIFIC EMBODIMENTS

Advantages and characteristics of the present disclosure and a method of achieving advantages and characteristics will become more apparent from the embodiments described in detail in conjunction with the accompanying drawings. However, the present disclosure is not limited to the disclosed embodiments, but may be implemented in various different ways. The embodiments are provided to only complete the present disclosure and to allow those skilled in the art to fully understand the category of the present disclosure. The present disclosure is defined by the category of the claims. The same reference numerals will be used to refer to the same or similar elements throughout the specification.

In this specification, when it is said that one part "includes" an element, the word "include" will be understood to imply the inclusion of stated parts, not the exclusion of other elements, unless explicitly described to the contrary. A term " . . . unit" described in the specification means a unit for processing at least one function or operation, and the unit may mean software, FPGA or a hardware element, for example. A function provided by " . . . unit" may be separated and performed by a plurality of elements and may be integrated into another additional element. In the specification, the term " . . . unit" is not necessarily limited to software or hardware and may be configured to be present in an addressable storage medium, and may include one or more micro-processors for processing data stored in a storage medium. Embodiments of the present disclosure are described in detail with reference to the accompanying drawings.

A system for reselling a reserved instance according to an embodiment of the present disclosure predicts instance usage of a client based on artificial intelligence using a machine learning model pre-trained in relation to instance usage of clients. The system for reselling a reserved instance is configured to automatically determine a reserved instance purchase quantity based on predicted instance usage, purchase a reserved instance from a reserved instance providing system, such as a cloud service system, and resell the purchased reserved instance to clients.

According to an embodiment of the present disclosure, the system for reselling a reserved instance can maximize an earnings rate according to the reselling of an instance by purchasing a proper quantity of reserved instances and reselling the reserved instances to clients. Furthermore, the system for reselling a reserved instance can provide a greater instance discount benefit to clients, can enlarge a white label partner, can prevent the breakaway of the existing clients including strategy clients, and can promote an earnings increase using an instance reselling earnings rate in acquiring new clients, by increasing the instance reselling earnings rate.

Furthermore, according to an embodiment of the present disclosure, a cloud service provider can increase sales by increasing a sales volume of reserved instances, and can stably secure profitability by securing instance utilization during a stipulated time. Furthermore, a client can have various instance discount benefits through the system for reselling a reserved instance, can pay a lower cost than an on-demand fee, and can use an instance, such as a virtual server provided by a cloud service provider.

Figure 1:
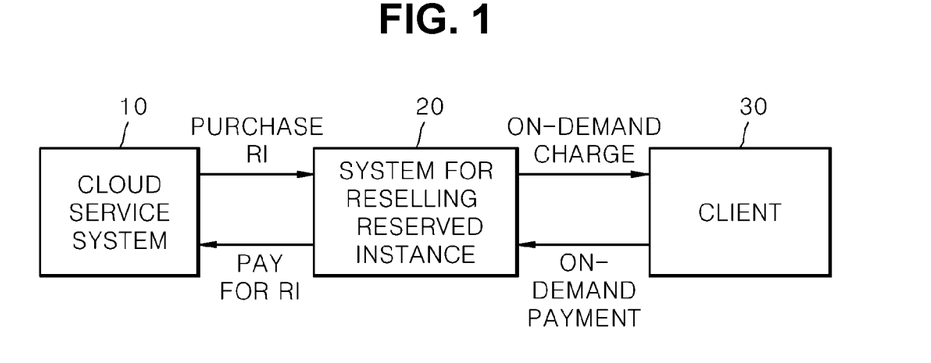
FIG. 1 is a conceptual view for describing a profit creation model of a system for reselling a reserved instance according to an embodiment of the present disclosure.

FIG. 1 is a conceptual view for describing a profit creation model of a system for reselling a reserved instance according to an embodiment of the present disclosure.

Referring to FIG. 1, the system 20 for reselling a reserved instance can create earnings by purchasing a reserved instance (RI) having a discounted price from one or a plurality of cloud service systems 10 and reselling the instance to one or a plurality of clients 30. The cloud service system 10 is a system for providing a reserved instance, and may include cloud providing systems, such as Amazon Web Service (AWS) and Azure.

The system 20 for reselling a reserved instance may pay a cost for a reserved instance purchased from the cloud service system 10, and may have payment for an on-demand cost corresponding to an on-demand request from the client 30. In this case, the system 20 for reselling a reserved instance can create earnings corresponding to the difference between the on-demand cost paid by the client and the cost for the reserved instance purchased from the cloud service system 10.

The system 20 for reselling a reserved instance may include wired/wireless communication interfaces for data communication with the cloud service system 10 and the client 30. The communication interfaces may include communication interfaces, such as a local area network (LAN), an integrated services digital network (ISDN), code division multiple access (CDMA), wideband code division multiple access (WCDMA), global system for mobile communication (GSM), long term evolution (LTE), world interoperability for microwave access (WIMAX), a wireless local area network (LAN), a wide area network (WAN), and wireless fidelity (Wi-Fi), but are not limited thereto.

Figure 2:
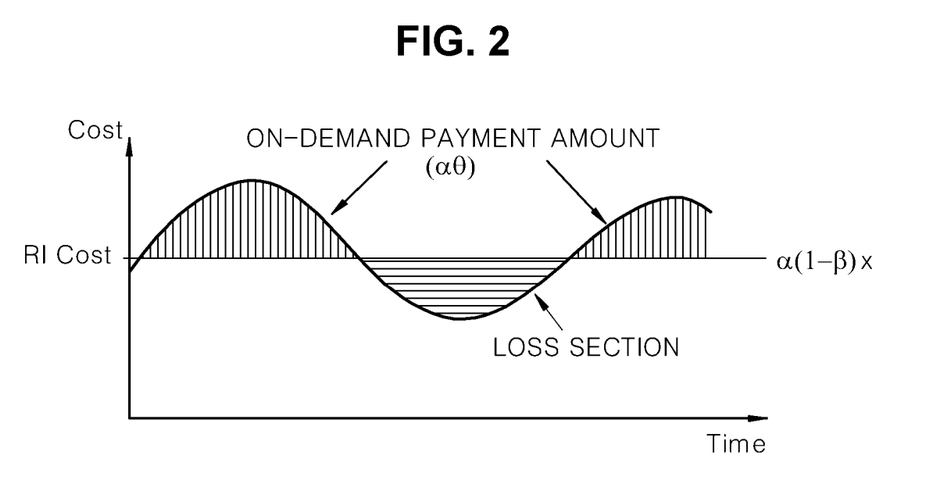
FIG. 2 is a conceptual view illustrating a profit corresponding to the difference between an on-demand instance selling price and a reserved instance payment cost in the system for reselling a reserved instance according to an embodiment of the present disclosure.

FIG. 2 is a conceptual view illustrating earnings corresponding to the difference between an on-demand instance selling price and a reserved instance payment cost in the system for reselling a reserved instance according to an embodiment of the present disclosure. In FIG. 2, x is a reserved instance purchase quantity (x>0), $\alpha$ is an instance price ($\alpha$>0), $\theta$ is actual instance usage ($\theta \geq 0$), and $\beta$ is the discount rate ($0<\beta<1$) of a reserved instance. $\alpha(1-\beta)x$ is a reserved instance purchasing cost to be paid to the cloud service system. $\alpha\theta$ is an on-demand instance sales cost to be paid by the client. When the on-demand sales cost is greater than the reserved instance purchasing cost, this corresponds to an earnings section.

However, when the reserved instance purchasing cost is greater than the on-demand sales cost, that is, when the reserved instance purchase quantity (x) is greater than $1/(1-\beta)$ times of actual instance usage ($\theta$), this belongs to a loss section.

Accordingly, in order to maximize earnings obtained by reselling a reserved instance to a client, it is necessary to accurately predict instance usage of clients (e.g., the number of on-demand requests), calculate a reserved instance purchase quantity based on a prediction value of the instance usage, and purchase a proper quantity of reserved instances from the cloud service system.

The system for reselling a reserved instance accurately predicts and purchases instance usage and provides an on-demand instance in response to a request from a client, in order to maximize earnings while minimizing the loss section.

The system for reselling a reserved instance according to an embodiment of the present disclosure may predict instance usage of clients through automatic analysis using an artificial intelligence (AI) method based on a machine learning model, and may provide reserved instance purchase recommendation information.

Figure 3:
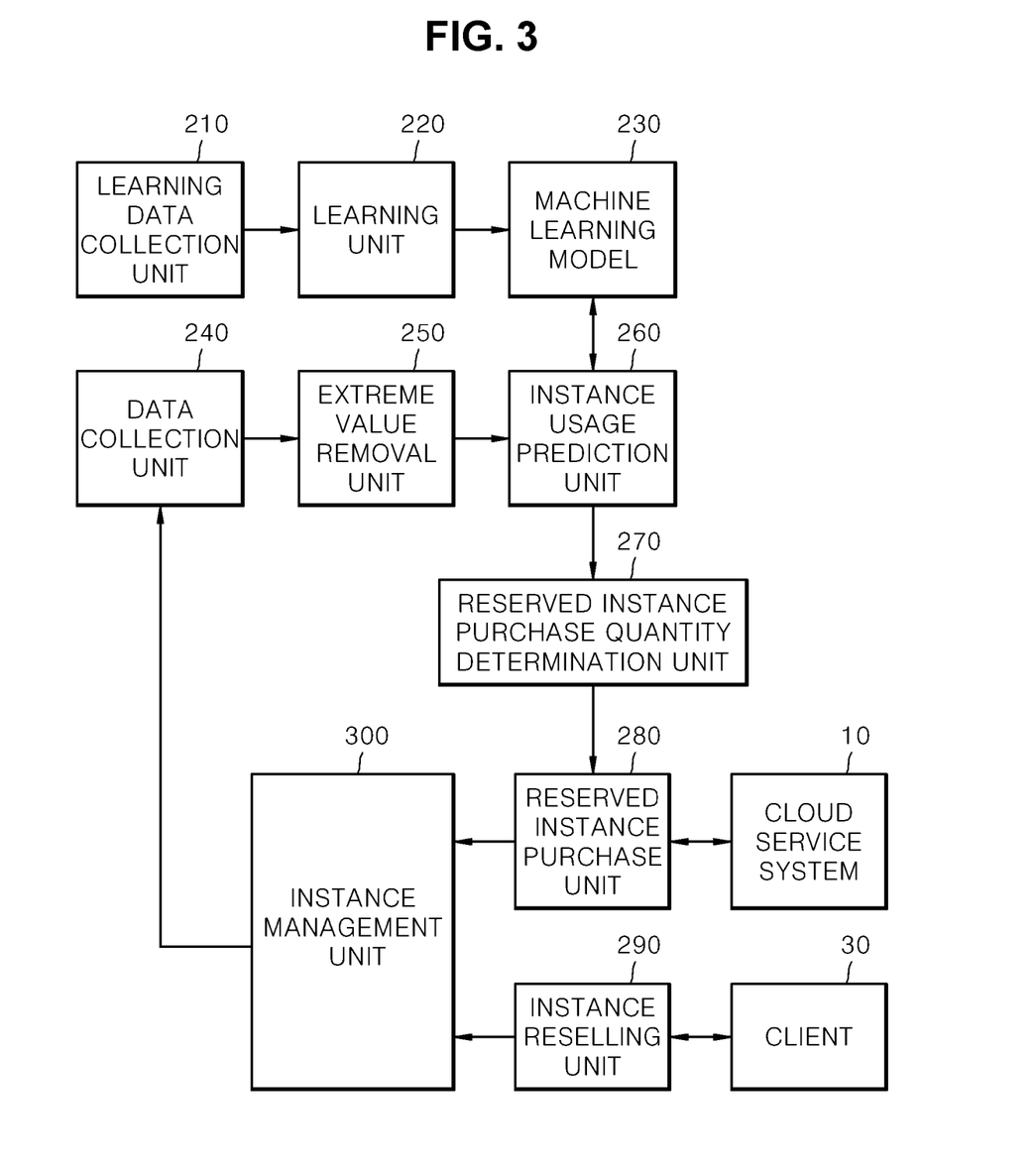
FIG. 3 illustrates a configuration of the system for reselling a reserved instance according to an embodiment of the present disclosure.
Figure 4:
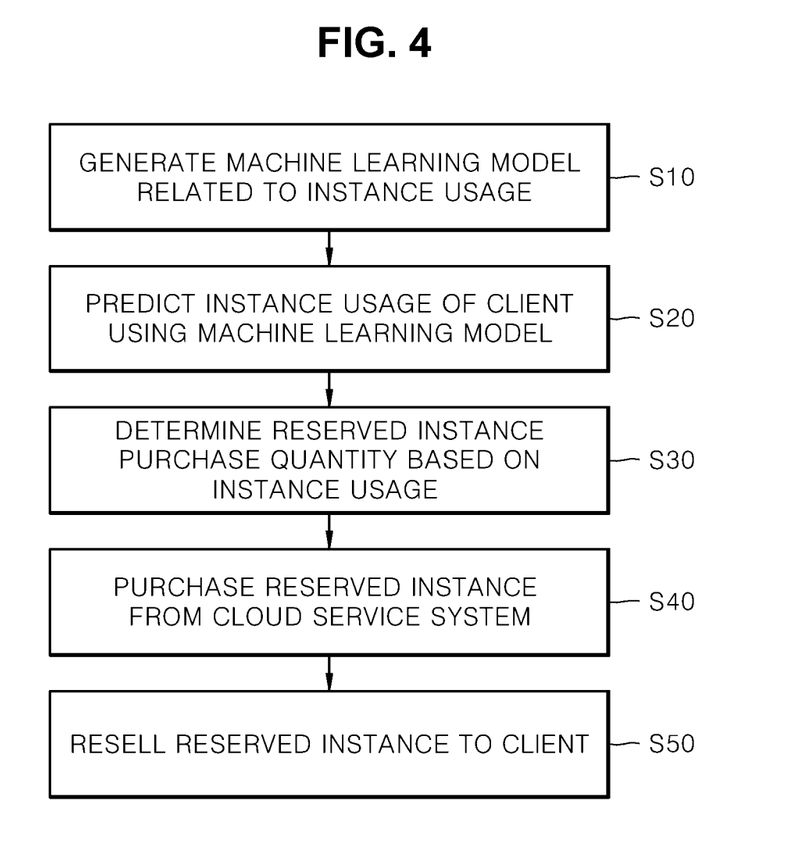
FIG. 4 is a flowchart illustrating a method of reselling a reserved instance according to an embodiment of the present disclosure.

FIG. 3 illustrates a configuration of the system for reselling a reserved instance according to an embodiment of the present disclosure. FIG. 4 is a flowchart illustrating a method of reselling a reserved instance according to an embodiment of the present disclosure.

Referring to FIGS. 3 and 4, in order to predict instance usage, the system 20 for reselling a reserved instance may include a learning data collection unit 210, a learning unit 220, a machine learning model 230, a data collection unit 240, an extreme value removal unit 250, an instance usage prediction unit 260, a reserved instance purchase quantity determination unit 270, a reserved instance purchase unit 280, an instance reselling unit 290, and an instance management unit 300.

The instance usage prediction unit 260 may predict instance usage of clients using the machine learning model 230 related to the instance usage.

The machine learning model 230 may be modeled based on a relation between independent variables, such as an instance use pattern of clients for each OS (OS) of an instance, for each region of an instance, for each instance type, and for each available area of an instance, and the number of clients, and dependent variables including instance usage of the clients.

The instance OS may be Windows/Linux, for example, but is not limited thereto. The type of instance may include instance types composed of various combinations of a CPU, a memory, a storage, and a networking capacity, like T2, C4, M4, M5, C5, etc. of Amazon EC2, for example. The instance region has several isolated locations called available regions. For example, Amazon EC2 includes regions, such as Eastern United States (Northern Virginia), Eastern United States (Ohio), Western United States (Northern California), Western United States (Oregon), Canada (middle region), EU (Frankfurt), EU (London), EU (Paris), Asia-Pacific regions (Seoul), Asia-Pacific regions (Tokyo), South America (Sao Paulo), etc, but the present disclosure is not limited thereto.

The learning data collection unit 210 and the learning unit 220 may be provided to generate the machine learning model 230 related to instance usage. The learning data collection unit 210 may collect learning data, including information of clients, such as an instance use pattern of clients for each OS, for each region, for each instance type, and for each available area in the past, and the number of clients. In an embodiment, the learning data may include the past on-demand request data of clients for an instance.

The learning unit 220 may generate one or a plurality of machine learning models by extracting variables of a reserved instance, including a use pattern and the number of clients for each instance type, for each OS, for each region, and for each available area, and instance usage, from learning data (step S10 in FIG. 4). The machine learning model may be provided as an instance usage prediction model trained by machine learning or deep learning in relation to instance usage.

In an embodiment, the learning unit 220 may generate at least one of machine learning models, including a generalized linear regression (GLR) model, a multivariate spline regression (MSR) model, a long short term memory (LSTM) model, and a multivariate regression (MR) model, but the models are illustrative. The learning unit 220 may generate machine learning models that are not enumerated.

The GLR model is a common multi-linear regression analysis model, and is a machine learning model for predicting instance usage using a usage pattern and the number of clients for each instance type, for each available area, and for each instance type as independent variables. The GLR model may determine a meaningful variable, among many variables, using an AIC-stepwise scheme, and may be used to predict instance usage by applying the variables in the form of a multi-linear relation.

The MSR model is a non-linear regression model for overcoming limits of a linear model that assumes linearity in an actual problem, and is a machine learning model for predicting instance usage by applying a smoothing function to the independent variables. The MSR model uses the same variables as the GLR model. In this case, the GLR model applies a relation between the variables in a linear form. In contrast, the MSR model may treat the pattern of each variable as one function, may apply a smoothing function to the variable, and may determine a meaningful variable of many variables by an ANOVA test. The smoothing degree (k_i) for each variable may be calculated by calculating k_i having the smallest error through K-fold cross validation.

The LSTM model is a deep learning-based machine learning model for predicting future instance usage from the past instance use time pattern. The LSTM model is a model designed to overcome that the learning ability is reduced due to a gradient decreased upon backward pass, that is, a disadvantage of a recurrent neural network (RNN), and may be used to predict instance usage by adding a cell state to a hidden state of the RNN. The LSTM model may be implemented as a model (e.g., 60 input layers, 2 hidden layers, and 1 output layer) for predicting a next 1 unit (time) based on a pattern of 60 units (time) in the past, for example.

The MR model is a prediction model for predicting instance usage through deep learning based on the same independent variables as a GLR scheme. The MR model (Keras-D/L) is a model for predicting the GLR scheme through deep learning in a Keras environment, and has the same variable information as the GLR model.

The instance usage prediction unit 260 may predict future instance usage of clients based on at least one of machine learning models, including the GLR model, the MSR model, the LSTM model, and the MR model.

The instance usage prediction unit 260 may predict future instance usage of clients based on information, such as an instance use pattern and the number of clients for each OS, for each region, for each available area, and for each instance type collected by the data collection unit 240.

The instance usage prediction unit 260 predicts instance usage in preparation for a future client instance request in the state in which an instance request has not been received from a client, calculates instance usage based on various machine learning models of the learning unit, and analyzes a predicted error of the instance usage for each of the plurality of machine learning models. Furthermore, the instance usage prediction unit 260 may assign weight to at least one machine learning model based on the predicted error or estimate instance usage by adjusting a reflection rate of each machine learning model.

The instance usage prediction unit 260 selects any one machine learning model based on a predicted error and weight or uses all of the plurality of machine learning models, but estimates instance usage by adjusting a reflection rate.

In order to predict instance usage more accurately by removing an error factor, the extreme value removal unit 250 may remove extreme value data out of a reference range among data collected by the data collection unit 240. The instance usage prediction unit 260 may predict instance usage for each OS, for each region, for each available area, and for each instance type based on independent variables of data from which extreme value data has been removed (step S20 in FIG. 4).

The reserved instance purchase quantity determination unit 270 may determine a reserved instance purchase quantity based on the instance usage predicted by the instance usage prediction unit 260 (step S30 in FIG. 4). In an embodiment, the reserved instance purchase quantity determination unit 270 may determine the reserved instance purchase quantity having a maximum earnings rate using a maximum likelihood estimation (MLE) algorithm based on the predicted instance usage of clients. Furthermore, the reserved instance purchase quantity determination unit 270 may recommend a reserved instance purchase quantity for a payer account being applied for each OS, for each region, for each available area, and for each instance type, may calculate an earnings rate when a reserved instance is purchased, and may provide the earnings rate.

The reserved instance purchase quantity determination unit 270 may calculate a reserved instance purchase quantity (x) by considering variables, such as an instance price ($\alpha$), the discount rate ($\beta$) of a reserved instance, and an instance usage prediction value ($\theta$). The reserved instance purchase quantity determination unit 270 may calculate the reserved instance purchase quantity based on the MLE algorithm. A likelihood function L($\theta$|x) is proportional to p(x|$\theta$), that is, a probability that a sample x may appear on the premise of A. When viewed from the samples x, the estimation of the parameter $\theta$ indicates a plausible degree.

The reserved instance purchase quantity determination unit 270 may determine the reserved instance purchase quantity by applying a different condition to the MLE model based on usage at each piece of timing. The reserved instance purchase quantity determination unit 270 may calculate the reserved instance purchase quantity by removing an extreme value that derives a bias using a percentile, such as 50%, 75%, 90%, or 95%. The reserved instance purchase quantity determination unit 270 may calculate the reserved instance purchase quantity (x) on which a maximum earnings rate (y) can be obtained using the MLE algorithm according to an equation below, for example.

$$\text{Maximize}(y) = \begin{cases} \alpha\beta x + \alpha(\theta - x) = \alpha(\beta x + (\theta - x)), & \text{for } (x - \theta) > 0 \\ \alpha\beta x, & \text{otherwise} \end{cases}$$

The reserved instance purchase unit 280 may purchase a reserved instance for each OS, for each region, for each available area, and for each instance type from the cloud service system 10 based on the reserved instance purchase quantity determined by the reserved instance purchase quantity determination unit 270 (step S40 in FIG. 4).

The instance reselling unit 290 may resell the reserved instance, purchased from the cloud service system 10, to a client in response to an on-demand request from the client (step S50 in FIG. 4). The instance reselling unit 290 may resell the reserved instance by providing various discount benefits depending on the type of client (e.g., a white label partner, a strategy client, or a new client).

In an embodiment, the instance reselling unit 290 may charge an on-demand amount to a client, and may charge a discounted on-demand amount to a new client or a strategy client in order to acquire the new client or prevent the breakaway of the strategy client. Furthermore, in order to prevent the breakaway of the strategy client, the instance reselling unit 290 may provide the strategy client with an instance discount benefit, such as providing the strategy client with a convertible reserved instance (RI) whose family may be changed at a standard RI price discounted from an on-demand fee, for example, by 40%.

The instance management unit 300 may manage a purchase history and sales history of a reserved instance for each OS, for each region, for each available area, and for each instance type, information on instances which may be sold to clients, etc. The information managed by the instance management unit 300 may be fed back to the learning data collection unit 210 and the data collection unit 240, and may be used to generate a machine learning model for determining a next reserved instance purchase quantity and to predict instance usage. The instance management unit 300 may include a function for supporting and managing a white label (WL) partner.

Figure 5:
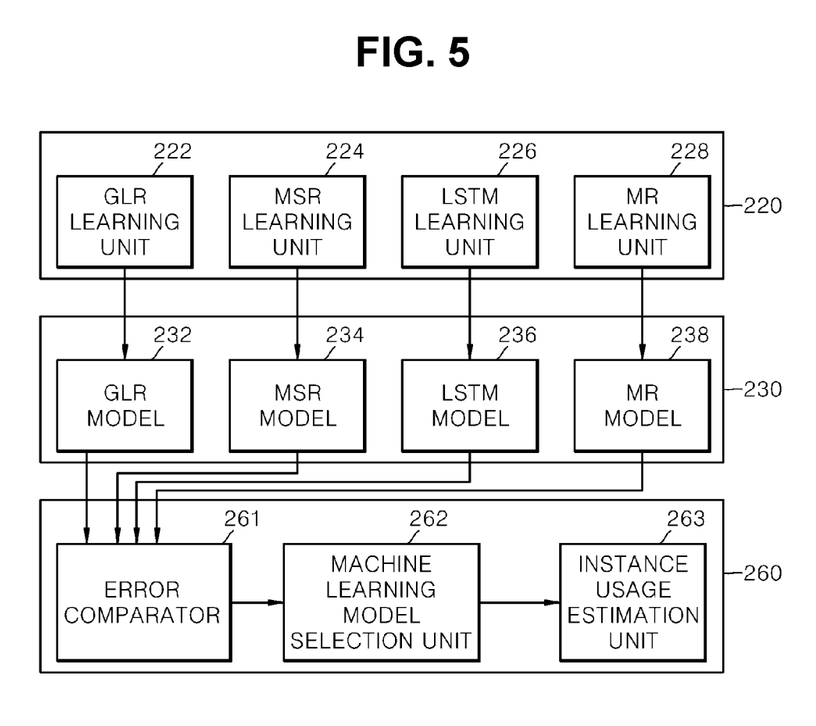
FIG. 5 illustrates a configuration of a learning unit and an instance usage prediction unit that constitute the system for reselling a reserved instance according to an embodiment of the present disclosure.
Figure 6:
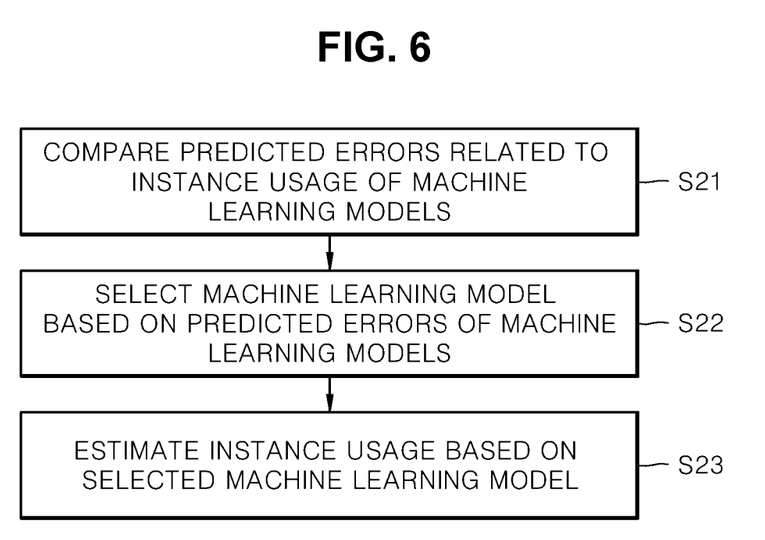
FIG. 6 is a flowchart illustrating a process of predicting instance predicting instance usage according to an embodiment of the present disclosure.

FIG. 5 illustrates a configuration of a learning unit and an instance usage prediction unit that constitute the system for reselling a reserved instance according to an embodiment of the present disclosure. FIG. 6 is a flowchart illustrating a process of predicting instance predicting instance usage according to an embodiment of the present disclosure. Referring to FIGS. 5 and 6, the learning unit 220 may generate a plurality of different machine learning models for predicting instance usage (step S21 of FIG. 6).

In an embodiment, the learning unit 220 may include a GLR learning unit 222 for generating the GLR model, an MSR learning unit 224 for generating the MSR model, an LSTM learning unit 226 for generating the LSTM model, and an MR learning unit 228 for generating the MR model.

The instance usage prediction unit 260 may include an error comparator 261, a machine learning model selection unit 262, and an instance usage estimation unit 263.

The error comparator 261 may compare predicted errors of machine learning models, including the GLR model 232, the MSR model 234, the LSTM model 236, and the MR model 238 (step S21 in FIG. 6). The machine learning model selection unit 262 may select any one of the machine learning models based on a result of the comparison between the predicted errors of the machine learning models (step S22 in FIG. 6). In an embodiment, the machine learning model selection unit 262 may calculate a root mean square error (RMSE) value of each of the machine learning models according to an equation below, for example, and may select a machine learning model having the smallest RMSE value.

$$\sqrt{\frac{1}{n}\sum_{i=1}^{n}(\text{actual value} - \text{prediction value})^2}$$

The instance usage estimation unit 263 may estimate instance usage based on one or more machine learning models selected by the machine learning model selection unit 262 (step S23 in FIG. 6). In an embodiment, the instance usage estimation unit 263 may predict the instance usage based on one machine learning model having the smallest RMSE value or may predict the instance usage based on one or more machine learning models having an RMSE value smaller than a reference value.

In an embodiment, if the instance usage is estimated using a plurality of machine learning models, the instance usage estimation unit 263 may estimate the instance usage for each OS, for each region, for each available area, and for each instance type by performing statistical processing (e.g., an arithmetical/geometrical average or a middle value) on pieces of instance usage estimated by the plurality of machine learning models.

Figure 7:
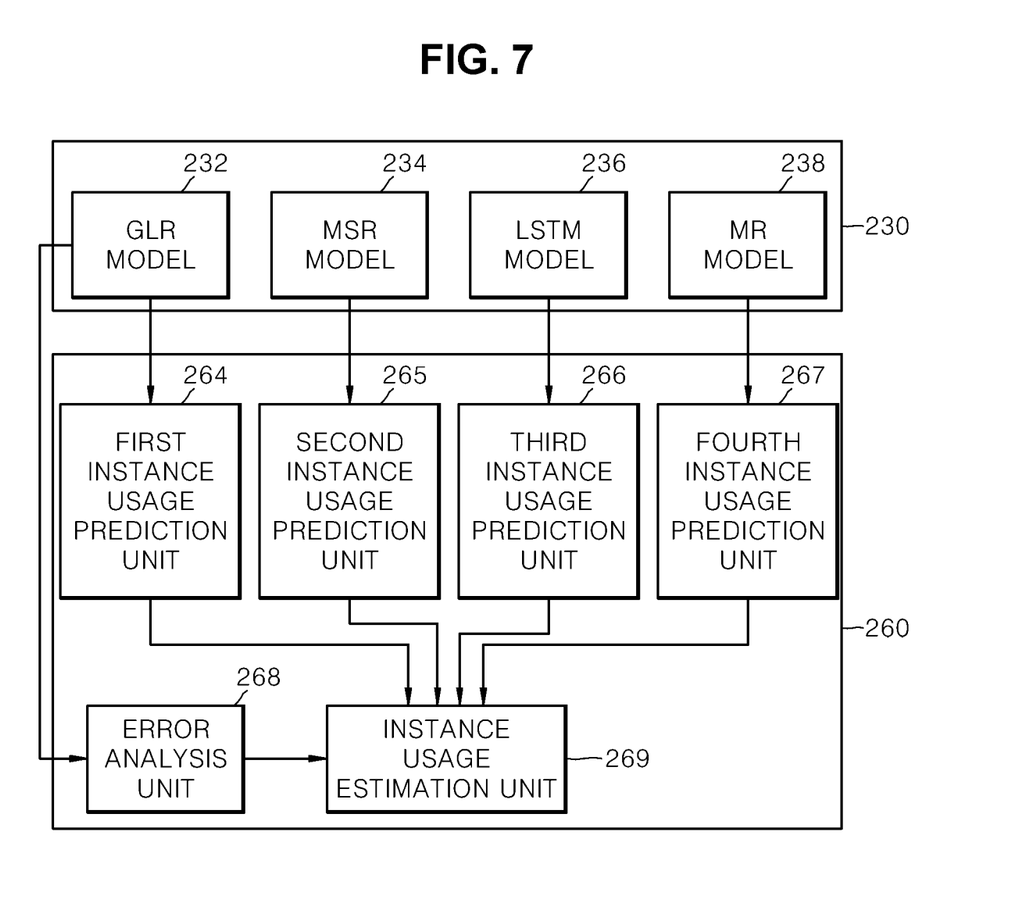
FIG. 7 illustrates a configuration of a learning unit and an instance usage prediction unit that constitute the system for reselling a reserved instance according to another embodiment of the present disclosure.
Figure 8:
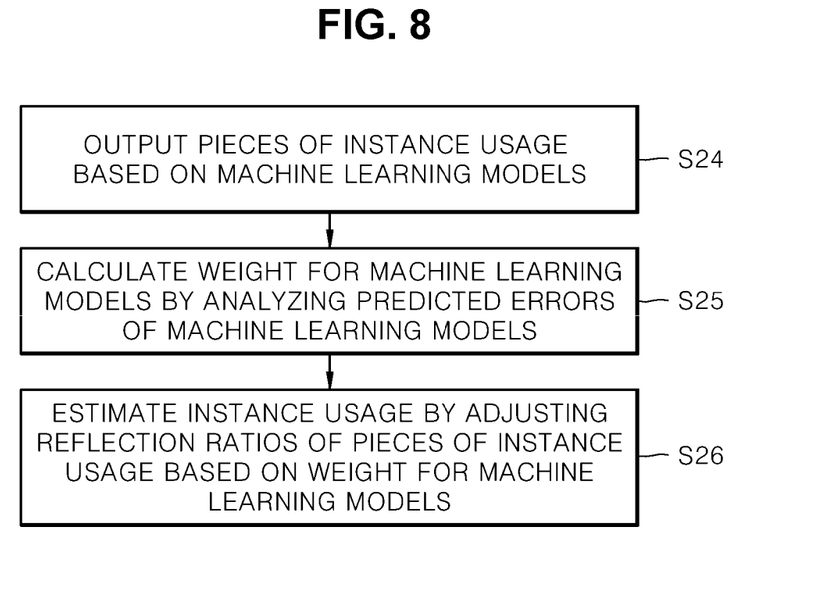
FIG. 8 is a flowchart illustrating a process of predicting instance predicting instance usage according to another embodiment of the present disclosure.

FIG. 7 illustrates a configuration of a learning unit and an instance usage prediction unit that constitute the system for reselling a reserved instance according to another embodiment of the present disclosure. FIG. 8 is a flowchart illustrating a process of predicting instance predicting instance usage according to another embodiment of the present disclosure. Referring to FIGS. 7 and 8, the instance usage prediction unit 260 may output a plurality of pieces of instance usage based on a plurality of different machine learning models (step S24 in FIG. 8).

The instance usage prediction unit 260 may include a first instance usage prediction unit 264, a second instance usage prediction unit 265, a third instance usage prediction unit 266, a fourth instance usage prediction unit 267, an error analysis unit 268, and an instance usage estimation unit 269.

The first instance usage prediction unit 264 may output first instance usage by predicting instance usage based on the GRL model 232. The second instance usage prediction unit 265 may output second instance usage by predicting instance usage based on the MSR model 234. The third instance usage prediction unit 266 may output third instance usage by predicting instance usage based on the LSTM model 236. The fourth instance usage prediction unit 267 may output fourth instance usage by predicting instance usage based on the MR model 238.

The error analysis unit 268 may calculate weight for the machine learning models, including the GRL model 232, the MSR model 234, the LSTM model 236, and the MR model 238, by analyzing predicted errors of the machine learning models (step S25 in FIG. 8).

The instance usage estimation unit 269 may estimate instance usage by adjusting reflection ratios of the first instance usage, the second instance usage, the third instance usage, and the fourth instance usage based on the weight for the machine learning models calculated by the error analysis unit 268 (step S26 in FIG. 8). In an embodiment, the instance usage estimation unit 269 may estimate the instance usage by assigning higher weight to a machine learning model having a smaller predicted error (e.g., RMSE).

Each of the machine learning models may be configured to predict instance usage in a plurality of different future periods (e.g., 1 month, 3 months, or 6 months). If predicted results have an increasing trend, an additional monthly reserved instance purchase quantity may be recommended by incorporating a predicted value in a 1-month unit (i.e., a minimum purchase period). In contrast, if the predicted results have a decreasing trend, a reserved instance purchase quantity may be recommended by incorporating a predicted value for 6 months (i.e., a predicted maximum period).

The aforementioned embodiments may be implemented as a hardware component, a software component and/or a combination of hardware and software components. For example, the apparatus, the method, and the elements described in the embodiments may be implemented using one or more general-purpose computers or special-purpose computers, for example, a processor, a controller, an arithmetic logic unit (ALU), a digital signal processor, a microcomputer, a field programmable gate array (FPGA), a programmable logic unit (PLU), a microprocessor or any other device capable of executing or responding to an instruction.

The processor may perform an operating system (OS) and one or more software applications executed on the OS. Furthermore, the processor may access, store, manipulate, process and generate data in response to the execution of software. For convenience of understanding, one processor has been illustrated as being used, but a person having ordinary skill in the art may understand that the processor may include a plurality of processing elements and/or a plurality of types of processing elements.

For example, the processor may include a plurality of processors or one processor and one controller. Furthermore, other processing configurations, such as a parallel processor, are also possible. Software may include a computer program, a code, an instruction or a combination of one or more of them, and may configure a processor so that it operates as desired or may instruct processors independently or collectively.

Software and/or data may be temporarily or permanently embodied in any type of a machine, component, physical device, virtual equipment, or computer storage medium or device or a transmitted signal wave so as to be interpreted by the processor or to provide an instruction or data to the processor. The software may be distributed to computer systems connected over a network and may be stored or executed in a distributed manner. The software and the data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure alone or in combination. The program instructions stored in the medium may be specially designed and constructed for the present disclosure, or may be known and available to those skilled in the field of computer software.

Examples of the computer-readable storage medium include magnetic media such as a hard disk, a floppy disk and a magnetic tape, optical media such as a CD-ROM and a DVD, and hardware devices specially configured to store and execute program instructions such as a ROM, a RAM, and a flash memory. Examples of the program instructions include not only machine language code that is constructed by a compiler, but also high-level language code that can be executed by a computer using an interpreter or the like. The hardware device may be configured in the form of one or more software modules for executing the operation of the embodiment, and the vice versa.

As described above, although the embodiments have been described in connection with the limited embodiments and drawings, those skilled in the art may modify and change the embodiments in various ways from the description. For example, proper results may be achieved although the above descriptions are performed in order different from that of the described method and/or the aforementioned elements, such as the system, configuration, device, and circuit, are coupled or combined in a form different from that of the described method or replaced or substituted with other elements or equivalents. Accordingly, other implementations, other embodiments, and equivalents of the claims fall within the scope of the claims.

What is claimed is:

1. A system for purchasing a reserved instance from a reserved instance providing system and reselling the reserved instance to a client, the system comprising:
a processor; and
a memory configured to store program instructions,
wherein the program instructions, when executed by the processor, implements:
a learning module configured to generate a machine learning model by analyzing data;
an instance usage prediction module configured to predict instance usage of a client using the machine learning model pre-trained through the learning module in relation to the instance usage of the client who is to sell a reserved instance;
a reserved instance purchase quantity determination module configured to determine a reserved instance purchase quantity based on the instance usage;
a reserved instance purchase module configured to purchase the reserved instance based on the reserved instance purchase quantity; and
an instance reselling module configured to resell the purchased reserved instance to the client,
wherein the instance usage prediction module comprises:
an error analysis module configured to calculate weight for a plurality of machine learning models by analyzing predicted errors of the plurality of machine learning models; and
an instance usage estimation module configured to estimate the instance usage of the client by adjusting a reflection ratio of each of the machine learning models for the instance usage based on the weight for the machine learning models,
wherein the learning module is configured to generate the machine learning model by extracting variables, comprising a use pattern and the number of clients for each operating system (OS) of the instance, for each instance type, for each region, and for each available area, from learning data comprising past on-demand request data requested by the client, and
wherein the learning module is configured to generate:
a generalized linear regression (GLR) model for predicting the instance usage using the usage pattern and the number of clients for each OS, for each instance type, for each region, and for each available area as independent variables,
a multivariate spline regression (MSR) model for predicting the instance usage by applying a smoothing function to the independent variables,
a long short term memory (LSTM) model for predicting a future instance use time pattern from a past instance use time pattern, and
a multivariate regression (MR) model for predicting the instance usage through deep learning based on the independent variables.

2. The system of claim 1, further comprising an extreme value removal module configured to predict the instance usage by removing data out of a reference range from data related to an instance request.

3. The system of claim 1, wherein the reserved instance purchase quantity determination module is configured to:
recommend a purchase quantity of the reserved instance for each OS, for each instance type, for each region, and for each available area,
calculate an earnings rate when the reserved instance is purchased, and
provide the earnings rate.

4. A system for purchasing a reserved instance from a reserved instance providing system and reselling the reserved instance to a client, the system comprising:
a processor; and
a memory configured to store program instructions,
wherein the program instructions, when executed by the processor, implements:
a learning module configured to generate a machine learning model by analyzing data;
an instance usage prediction module configured to predict instance usage of a client using the machine learning model pre-trained through the learning module in relation to the instance usage of the client who is to sell a reserved instance;
a reserved instance purchase quantity determination module configured to determine a reserved instance purchase quantity based on the instance usage;
a reserved instance purchase module configured to purchase the reserved instance based on the reserved instance purchase quantity; and
an instance reselling module configured to resell the purchased reserved instance to the client,
wherein the instance usage prediction module comprises:
an error analysis module configured to calculate weight for a plurality of machine learning models by analyzing predicted errors of the plurality of machine learning models; and
an instance usage estimation module configured to estimate the instance usage of the client by adjusting a reflection ratio of each of the machine learning models for the instance usage based on the weight for the machine learning models,
wherein the error analysis module is configured to analyze a predicted error of at least one of the machine learning models comprising a GLR model, an MSR model, an LSTM model, and an MR model generated by the learning module, and
wherein the instance usage prediction module comprises:
a first instance usage prediction module configured to output first instance usage by predicting the instance usage based on the GLR model;
a second instance usage prediction module configured to output second instance usage by predicting the instance usage based on the MSR model;
a third instance usage prediction module configured to output third instance usage by predicting the instance usage based on the LSTM model; and
a fourth instance usage prediction module configured to output fourth instance usage by predicting the instance usage based on the MR model.

5. The system of claim 4, wherein the instance usage estimation module is configured to estimate the instance usage by adjusting a reflection ratio of each of the first instance usage, the second instance usage, the third instance usage, and the fourth instance usage based on the weight for the machine learning models.

6. A method of purchasing a reserved instance from a reserved instance providing system and reselling the reserved instance to a client, the method comprising:

predicting instance usage of a client using a machine learning model pre-trained in relation to the instance usage of a client who is to sell a reserved instance;

determining a reserved instance purchase quantity based on the instance usage;

purchasing the reserved instance from the reserved instance providing system based on the reserved instance purchase quantity; and reselling the purchased reserved instance to the client, wherein predicting the instance usage comprises:

calculating, by a processor, weight for a plurality of machine learning models by analyzing predicted errors of the plurality of machine learning models; and estimating, by the processor, the instance usage by adjusting a reflection ratio of each of the machine learning models for the instance usage based on the weight for the machine learning models, wherein generating the machine learning model comprises generating a GLR model for predicting the instance usage using a usage pattern and the number of clients for each OS, for each instance type, for each region, and for each available area as independent variables, an MSR model for predicting the instance usage by applying a smoothing function to the independent variables, an LSTM model for predicting a future instance use time pattern from a past instance use time pattern, and an MR model for predicting the instance usage through deep learning based on the independent variables.

7. The method of claim 6, further comprising generating the machine learning model by extracting variables, comprising a use pattern and the number of clients for each operating system (OS) of the instance, for each instance type, for each region, and for each available area, from learning data comprising past on-demand request data requested by the client.

8. The method of claim 6, wherein the plurality of machine learning models comprises a generalized linear regression (GLR) model, a multivariate spline regression (MSR) model, a long short term memory (LSTM) model, and a multivariate regression (MR) model.

9. The method of claim 6, wherein predicting the instance usage comprises:

outputting first instance usage by predicting the instance usage based on the GLR model;

outputting second instance usage by predicting the instance usage based on the MSR model;

outputting third instance usage by predicting the instance usage based on the LSTM model;

outputting fourth instance usage by predicting the instance usage based on the MR model, and estimating the instance usage by adjusting a reflection ratio of each of the first instance usage, the second instance usage, the third instance usage, and the fourth instance usage based on the weight for the machine learning models.

10. The method of claim 6, wherein predicting the instance usage comprises removing data out of a reference range from data related to an instance request.

11. The method of claim 6, wherein determining the reserved instance purchase quantity comprises:

recommending a purchase quantity of the reserved instance for each OS, for each instance type, for each region, and for each available area, calculating an earnings rate when the reserved instance is purchased, and providing the earnings rate.

* * * * *